(12) United States Patent
Patil et al.

(10) Patent No.: US 12,172,498 B2
(45) Date of Patent: Dec. 24, 2024

(54) VEHICLE OXYGEN GENERATING SYSTEM

(71) Applicant: Nissan North America, Inc., Franklin, TN (US)

(72) Inventors: Sandeep Patil, Farmington Hills, MI (US); Mohammed Hussain Abdul Jabbar, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 777 days.

(21) Appl. No.: 17/362,808

(22) Filed: Jun. 29, 2021

(65) Prior Publication Data
US 2022/0410667 A1    Dec. 29, 2022

(51) Int. Cl.
*B60H 3/00* (2006.01)
*B60H 1/00* (2006.01)
*C25B 1/04* (2021.01)
*B60H 1/14* (2006.01)
*B60H 1/18* (2006.01)
*B60H 1/22* (2006.01)

(52) U.S. Cl.
CPC ....... *B60H 3/0007* (2013.01); *B60H 1/00385* (2013.01); *C25B 1/04* (2013.01); *B60H 1/143* (2013.01); *B60H 1/18* (2013.01); *B60H 1/2215* (2013.01)

(58) Field of Classification Search
CPC ... B01J 7/00; C25B 1/042; C25B 1/04; C01B 3/042; B60H 1/143; B60H 1/18; B60H 1/2215; B60H 1/00385; B60H 3/0007
See application file for complete search history.

(56) References Cited

U.S. PATENT DOCUMENTS

| | | | |
|---|---|---|---|
| 5,170,637 A * | 12/1992 | Shyu | F24F 3/12 62/176.1 |
| 5,399,251 A * | 3/1995 | Nakamats | C25B 15/00 204/266 |
| 2002/0090868 A1* | 7/2002 | Schmitman | H01M 8/186 440/113 |

FOREIGN PATENT DOCUMENTS

| WO | 2014109554 A1 | 7/2014 |
|---|---|---|
| WO | 2017157287 A1 | 9/2017 |

* cited by examiner

*Primary Examiner* — Lessanework Seifu
(74) *Attorney, Agent, or Firm* — Global IP Counselors, LLP

(57) ABSTRACT

A vehicle oxygen generating system includes a heat source, a power source, a vehicle air handling assembly of a vehicle air conditioning system, an $H_2O$ source and an electrochemical oxygen producing device. The oxygen producing device is connected to the $H_2O$ source receiving $H_2O$ therefrom. The oxygen producing device uses heat from the heat source and electricity from the power source to produce $H_2$ and $O_2$ from $H_2O$. The $O_2$ produced by the oxygen producing device is directed to the vehicle air handling assembly and moved into a passenger compartment of a vehicle.

19 Claims, 11 Drawing Sheets

VEHICLE OXYGEN GENERATING SYSTEM

BACKGROUND

Technical Field

The present disclosure generally relates to vehicle oxygen generating system. More specifically, the present disclosure relates to a vehicle oxygen generating system that conducts electrolysis on water to produce $O_2$, then provide the produced $O_2$ to a passenger compartment of a vehicle.

Background Information

Vehicle operators occasionally struggle with staying alert while driving. In particular, vehicle operators occasionally struggle with staying alert during long distant trips.

SUMMARY

It has been discovered that supplying a vehicle operator with an increased oxygen level within a passenger compartment of a vehicle helps reduce or eliminate drowsiness.

In view of the state of the known technology, one aspect of the present disclosure is to provide a vehicle oxygen generating electrochemical system with a heat source and an electricity producing power source, a vehicle air handling assembly of a vehicle air conditioning system, an $H_2O$ source and an oxygen producing device. The oxygen producing device is connected to the $H_2O$ source receiving $H_2O$ therefrom. The oxygen producing device uses heat from the heat source and electricity from the power source to produce $H_2$ and pure $O_2$ from $H_2O$. The pure $O_2$ produced by the oxygen producing device is directed to the vehicle air handling assembly and moved into a passenger compartment of a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
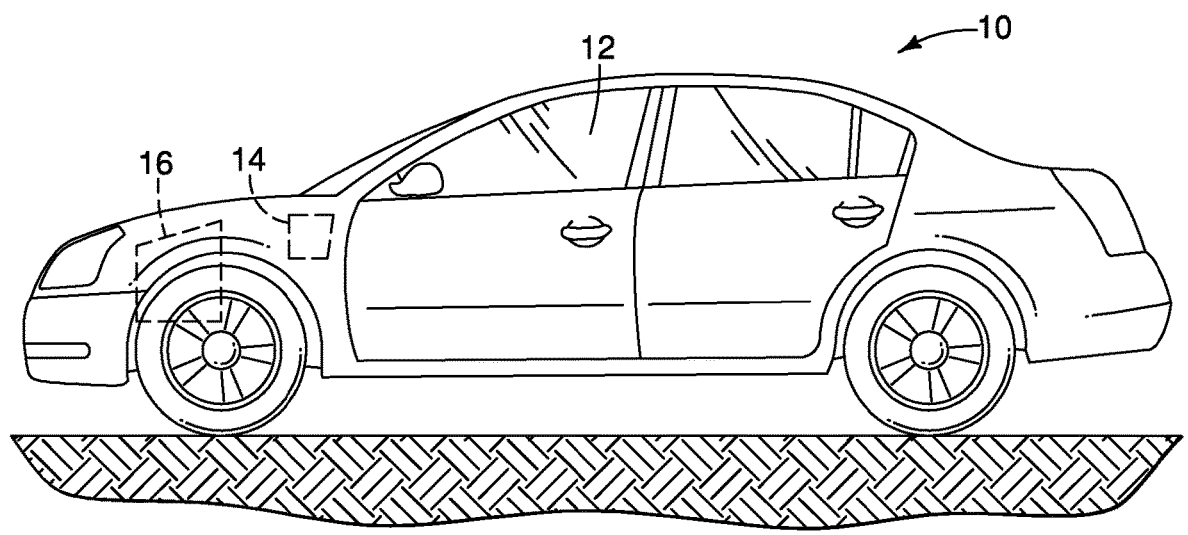
FIG. 1 is a side view of a vehicle that includes a passenger compartment, an engine and a vehicle oxygen generating system in accordance with a first embodiment.

Referring initially to FIG. 1, a vehicle 10 with a passenger compartment 12, a vehicle oxygen generating system 14 (FIG. 2) that provides oxygen to the passenger compartment 12 and an engine 16, is illustrated in accordance with a first embodiment.

Figure 2:
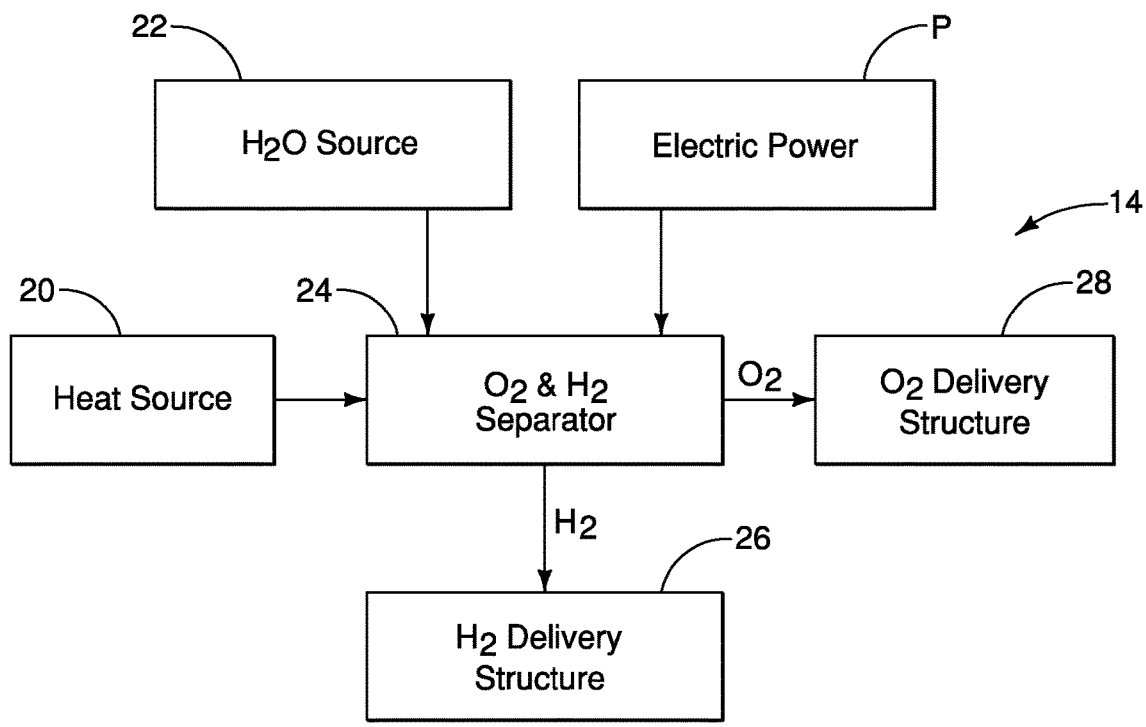
FIG. 2 is a block of the vehicle oxygen generating system in accordance with the first embodiment.

As shown in FIG. 2, the vehicle oxygen generating system 14 includes a heat source 20, a power source P, an $H_2O$ source 22, an $O_2$ and $H_2$ separator 24, an $H_2$ delivery structure 26 and an $O_2$ delivery structure 28 that provides $O_2$ delivery to the passenger compartment structure 12. A detailed description of the vehicle oxygen generating system 14 (herein after the oxygen generating system 14) is provided below following a further description of select features of the vehicle 10.

In the first embodiment, the engine 16 can be any of a variety of types of power plants, such as an internal combustion engine, a hybrid engine with both internal combustion engine and electric powered components, or an electric motor or plurality of electric motors. In several of the embodiments described below, the engine 16 is preferably an internal combustion engine (gas or diesel powered). The engine 16 includes a fuel delivery structure 19. The power source P can be a battery of the vehicle 10 and/or an alternator (not shown) that produces electric power using rotary power from the engine 16.

Figure 3:
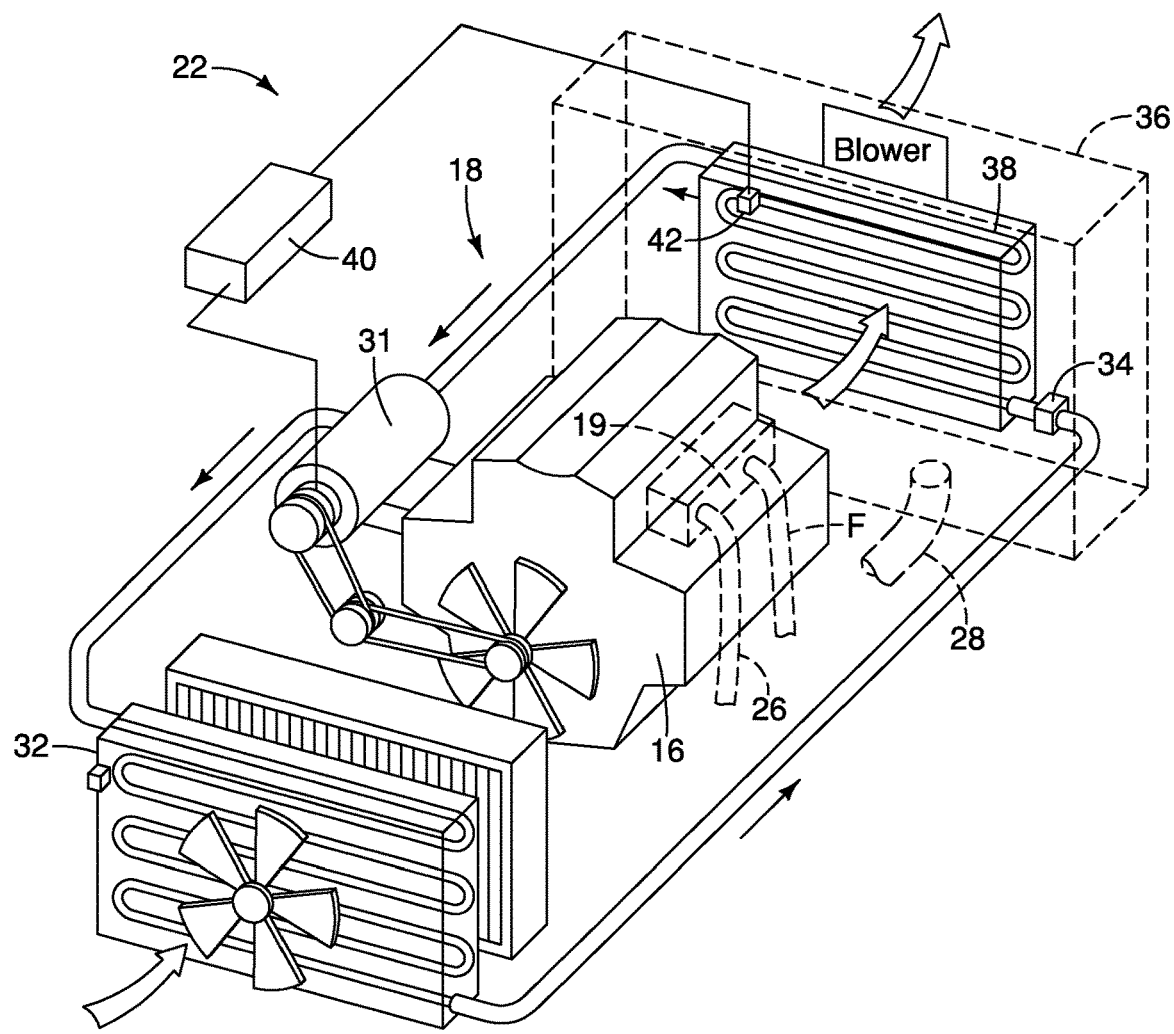
FIG. 3 is a schematic diagram of the engine and an air conditioning system of the vehicle depicted in FIG. 1, showing elements of the vehicle oxygen generating system in accordance with the first embodiment.

As shown in FIG. 3, the vehicle 10 also includes, among other components and features, an air conditioning system 30.

As shown FIG. 3, removed from the vehicle 10, the air conditioning system 30 includes a compressor 31, a condenser 32, an expansion valve 34, a vehicle air handling assembly 36, an evaporator 38 within the vehicle air handling assembly 36 and an AC controller 40 connected to at least the compressor 31 and a temperature sensor 42. The temperature sensor 42 is located within the vehicle air handling assembly 36 on or adjacent to the evaporator 36.

As shown in FIG. 3, the compressor 31 is provided with power via the engine 16. The compressor 31 includes a clutch mechanism (not shown) that is operated by the AC controller 40 in a conventional manner. Since operation of the compressor 31, the condenser 32 and the expansion valve 34 are conventional and well known in the automotive industry, further description is omitted for the sake of brevity.

The vehicle air handling assembly 36 (hereinafter the air handling assembly 36) is configured to direct air to selected areas of the passenger compartment 12 in a conventional manner. Specifically, the air handling assembly 36 is typically a housing with the evaporator 38 and a heater core 39 (FIG. 4) disposed therein that includes various ducts (not shown) and an electric fan or fans (not shown). Conditioned are (heated or cooled) passes through the air handling assembly 36 and into areas of the passenger compartment 12 as selected by a vehicle passenger or vehicle operator. Since air handling assemblies are conventional structures well known in the art, further description is omitted for the sake of brevity.

In the first embodiment, as shown in FIG. 3, the $O_2$ delivery structure 28 of the oxygen generating system 14 is connected to the air handling assembly 36, as is described further below. Alternatively, the $O_2$ delivery structure 28 can be a separate duct/vent (described further below with reference to FIG. 16) that delivers $O_2$ directly into the passenger compartment 12 in a manner separate from the operation of the air handling assembly 36 of the air conditioning system 30.

The heat source 20 can be any of a variety of mechanisms and/or devices within the vehicle 10. For example, the heat source 20 can be an electrically powered heater, the radiative heat from the engine 16, the condenser 32 of the air conditioning system 30, or can be part of an exhaust system, as is described further below.

The $H_2O$ source 22 can be a reservoir or tank installed within the structure of the vehicle 10 and be easily refilled. The $H_2O$ source 22 can also be condensed water from the air handling assembly 36 of the air conditioning system 30.

The $H_2$ delivery structure 26 is preferably a tube or duct that directs $H_2$ from the $O_2$ and $H_2$ separator 24 to any of a variety of destinations. For example, as shown in FIG. 3, the $H_2$ delivery structure 26 is tube that directs $H_2$ into the engine fuel delivery system 19 where the $H_2$ is mixed with fuel from a fuel line F and consumed by the engine 16 during operation of the vehicle 10. Alternatively, the $H_2$ delivery structure 26 can be a tube or duct that directs $H_2$ into the exhaust system of the vehicle 10 where the $H_2$ is consumed by the exhaust gases passing therethrough.

Figure 4:
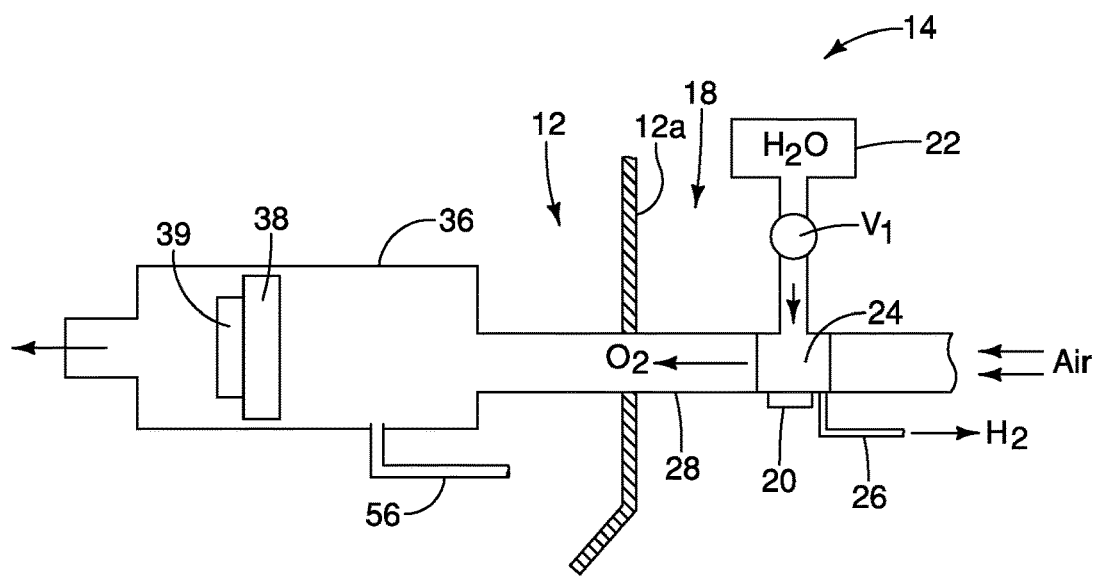
FIG. 4 is a schematic diagram showing an $O_2$ and $H_2$ separator of the vehicle oxygen generating system and an air handling assembly of the air conditioning system in accordance with the first embodiment.

As shown in FIG. 4, an engine compartment 18 and the passenger compartment 12 are separated from one another by a dashwall 12a. In the first embodiment, the oxygen generating system 14 is arranged such that the heat source 20, the $H_2O$ source 22, a valve $V_1$, the $O_2$ and $H_2$ separator 24 and the $H_2$ delivery structure 26 are all located within the engine compartment 18. The air handling assembly 36 of the air conditioning system 30 is located within the passenger compartment 12.

The $O_2$ delivery structure 28 is a tube or duct that extends from the $O_2$ and $H_2$ separator 24 within the engine compartment 18, through the dash wall 12a and to the air handling assembly 36. In the depicted embodiment, the $O_2$ delivery structure 28 can be a 25 NB schedule 40 pipe or other similar material.

Figure 5:
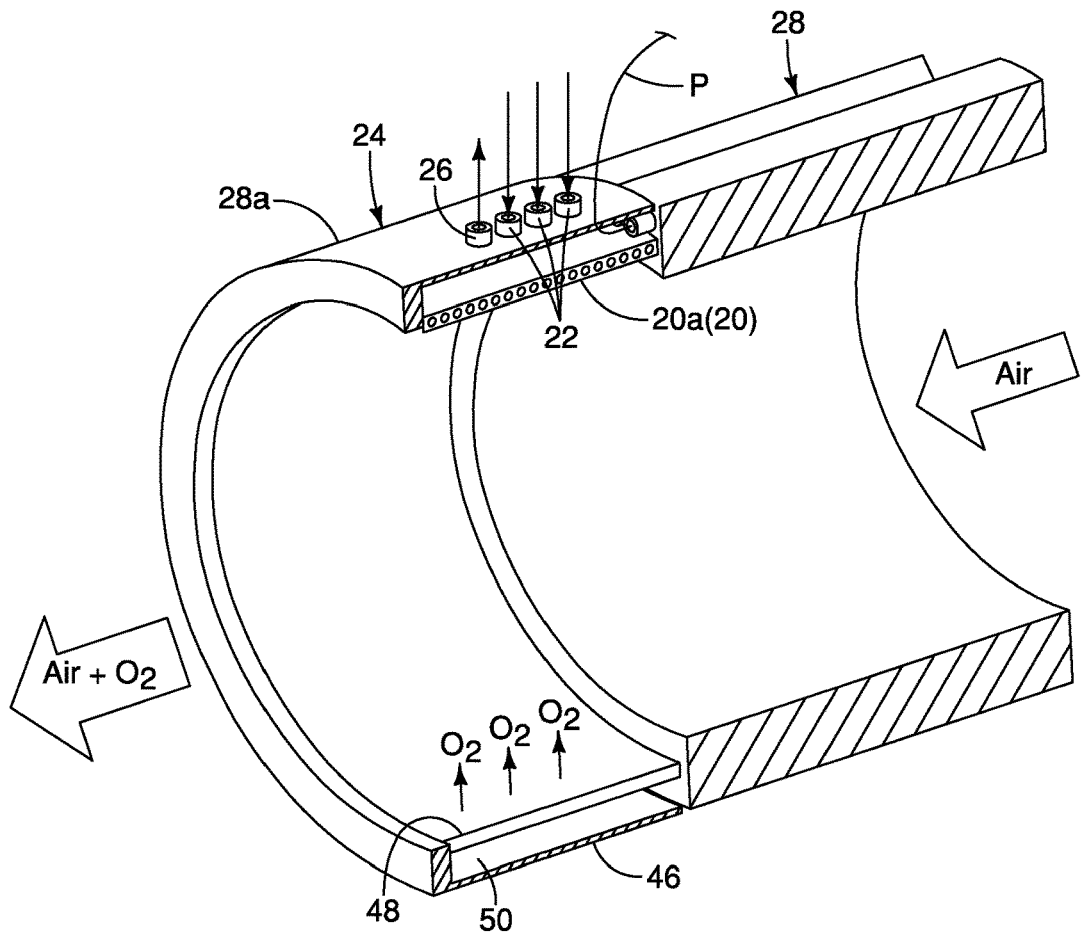
FIG. 5 is a perspective cross-sectional view of elements of the $O_2$ and $H_2$ separator of the vehicle oxygen generating system in accordance with the first embodiment.

The $O_2$ and $H_2$ separator 24 in accordance with the first embodiment will now be described in greater detail with specific reference to FIG. 5. The $O_2$ and $H_2$ separator 24 is an electrochemical construct that uses electric power and heat to separate $O_2$ and $H_2$ from $H_2O$. As shown in FIG. 5, the $O_2$ delivery structure 28 of the $O_2$ and $H_2$ separator 24 includes a duct section 28a with fresh air flowing through the duct section 28a and the remainder of $O_2$ delivery structure 28. The duct section 28a includes an outer wall 46 and an inner wall 48 that define and confine a hollow annular shaped chamber 50 therebetween. The outer wall 46 includes one or more water ($H_2O$) inlets that receive $H_2O$ from the $H_2O$ source 22. The water inlets of the $H_2O$ source 22 can include an atomizer or water distributing fixture (not shown) that assists in turning at least some of the liquid water into vapor. A radial inner surface of the outer wall 46 and/or a radial outer surface of the inner wall 48 can include serrations (not shown) providing an increased surface area for contact and vaporization of water during electrolysis.

Figure 6:
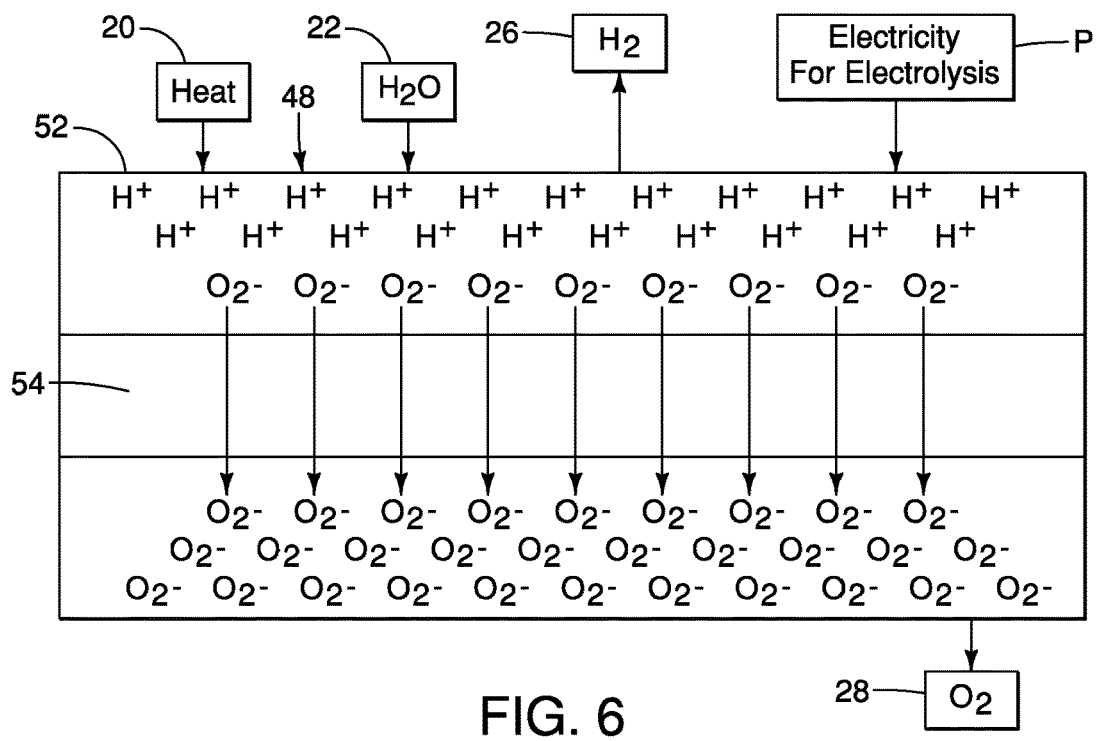
FIG. 6 is a schematic view of the $O_2$ and $H_2$ separator of the vehicle oxygen generating system having an $O_2$ separating membrane in accordance with the first embodiment.

The outer wall 46 and/or the inner wall 48 include heating elements 20a that define the heat source 20. The heating elements 20a can be coils embedded in the inner wall 48 or can be heating strips positioned along the radially inward surface of the surfaces that define the chamber 50. The heat source 20 is provided with electric power P, as shown in FIGS. 5 and 6. Operation of the oxygen generating system 14 in the first embodiment requires temperatures within the chamber 50 to be, for example, between 400 and 800 degrees C.

As shown schematically in FIG. 6, the inner wall 48 can be made of, for example, a layer of oxide electrolyzer material 52 that includes an oxide membrane electrolyzer 54 that allows passage of $O_2$ therethrough but prevents passage of $H_2$ therethrough.

The layer of oxide electrolyzer material 52 of the inner wall 48 is supplied with an electric current from the power source P for electrolysis of $H_2O$ such that $O_2$ and $H_2$ are separated from one another. The layer of oxide electrolyzer material 52 is also provided with heat from the heat source 20 as the electrolytic separation process requires temperatures of at least 400 degrees C.

The layer of oxide electrolyzer material 52 of the inner wall 48 causes electrolysis of the $H_2O$. Released $O_2$ passes through the oxide membrane electrolyzer 54 of the inner wall 48 and passes from the chamber 50 to the interior of the first duct section 28a and the $O_2$ delivery structure 28. Released $H_2$ within the chamber 50 passes out through the $H_2$ delivery structure 26 and into, for example, the engine fuel delivery system 19. The electrolysis conducted by the layer of oxide electrolyzer material 52 of the outer wall 50 on $H_2O$ can be thought of as the reverse of the operation of a Hydrogen Fuel Cell. Since oxide electrolyzer materials and $O_2$ separating membranes are conventional materials well known in the art, further description is omitted for the sake of brevity.

During operation of the vehicle 10 and operation of the oxygen generating system 14, oxygen ($O_2$) is supplied to the passenger compartment 12 in order to increase the level of $O_2$ within the passenger compartment 12. Increases in the level of $O_2$ within the passenger compartment 12 helps a vehicle operator to stay more alert. The increase in the level of oxygen ($O_2$) supplied to the passenger compartment 12 by the oxygen generating system 14 is subtle and is not intended to provide an overwhelming increase in $O_2$ level within the passenger compartment 12. Rather the increase can be small, for example, an increase of between 1% and 10% of the overall level of oxygen in the air within the passenger compartment 12. If increased levels of oxygen are not wanted by the vehicle operator, then the oxygen generating system 14 can be shut off by the controller 40 closing the valve $V_1$ to the $H_2O$ source 20 and shutting off the power P to the $O_2$ and $H_2$ separator 24. For the type of electrolyzer devices used herein, one gallon of water requires approximately 21 kWh of energy to produce 3.32 kg of $O_2$ and 0.42 kg of $H_2$. The amount of $O_2$ produced is 8 times higher than $H_2$. Since only a small amount of $O_2$ is produced per hour in the embodiments described herein, the amount of power P used to produce a desired level of $O_2$ is only a fraction of the approximate 21 kWh of energy used to produce 3.32 kg of $O_2$.

As shown in FIG. 4, the air handling assembly 36 includes a condensation drain 56. In most vehicles, the condensation from the air handling assembly 36 is drained to the ground beneath the vehicle 10. However, in the present disclosure, one option is to collect the water draining from the condensation drain 56 and direct it via a pump (not shown) into the $H_2O$ source 22 (tank) for use in the production of oxygen by the oxygen generating system 14.

Figure 7:
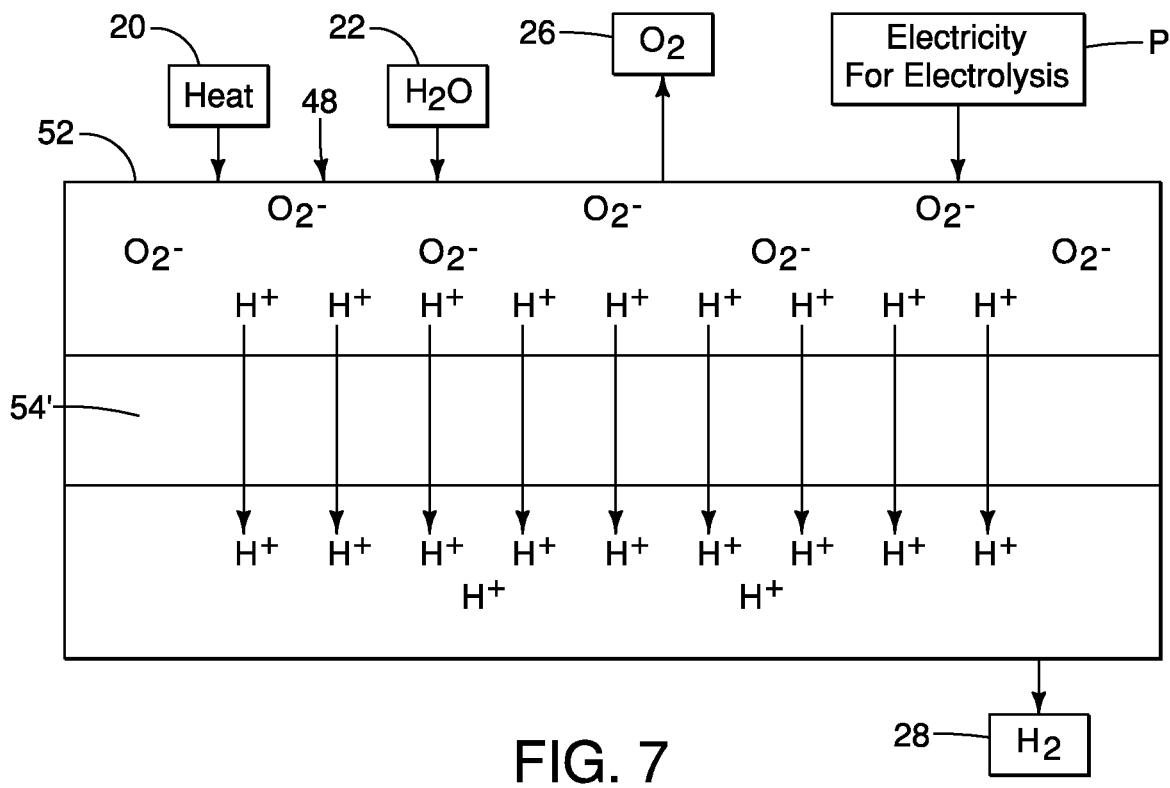
FIG. 7 is a schematic view of a modified $O_2$ and $H_2$ separator of the vehicle oxygen generating system having an $H_2$ separating membrane in accordance with the first embodiment.

As shown in FIG. 7 in a modification to the first embodiment, the inner wall 48 can include the above described layer of oxide electrolyzer material 52. However, the inner wall 48 is modified by replacing the oxide membrane electrolyzer 54 with an $H_2$ separating membrane 54' (a proton membrane electrolyzer). Electrolysis effected by the layer of oxide electrolyzer material 52 is as described above. However, the inclusion of the $H_2$ separating membrane 54' causes the passage of $H_2$ therethrough but prevents the passage of $O_2$ therethrough. Since $H_2$ separating membranes are conventional materials well known in the art, further description is omitted for the sake of brevity.

Second Embodiment

Figure 8:
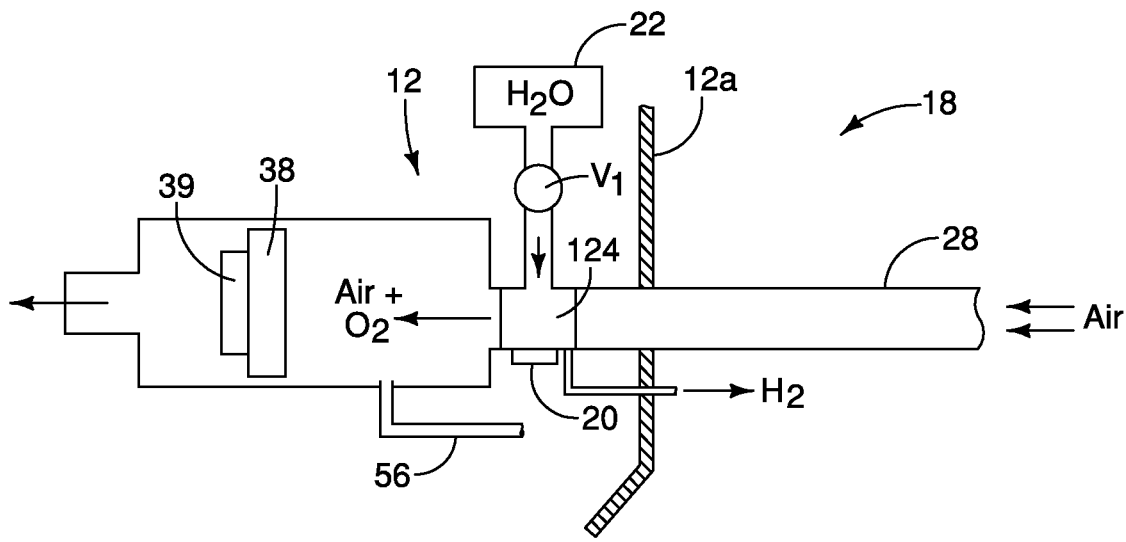
FIG. 8 is a schematic diagram showing an $O_2$ and $H_2$ separator of the vehicle oxygen generating system and an air handling assembly of the air conditioning system in accordance with a second embodiment.

Referring now to FIG. 8, an oxygen generating system 114 in accordance with a second embodiment will now be explained. In view of the similarity between the first and second embodiments, the parts of the second embodiment that are identical to the parts of the first embodiment will be given the same reference numerals as the parts of the first embodiment.

The oxygen generating system 114 in accordance with the second embodiment is arranged such that the heat source 20, the $H_2O$ source 22, a valve $V_1$, an $O_2$ and $H_2$ separator 124 and the $H_2$ delivery structure 26 are all located within the engine compartment 18.

The $H_2$ delivery structure 26 passes through a small opening in the dashwall 12a such that $H_2$ can be delivered to the engine fuel delivery system 19 in a manner described above with reference to the first embodiment. Otherwise, operation and function of each of the components of the oxygen generating system 114 is the same as the oxygen generating system 14 of the first embodiment.

Third Embodiment

Figure 9:
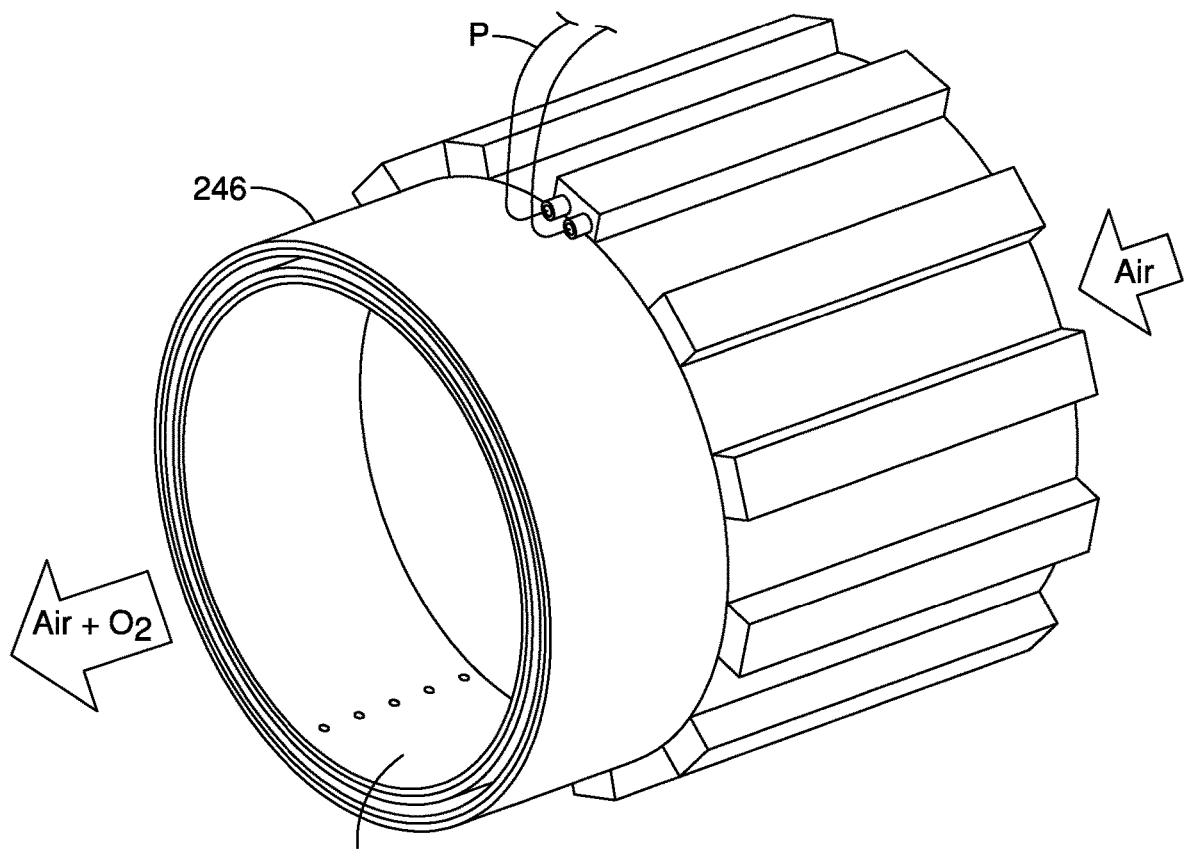
FIG. 9 is a perspective cross-sectional view of elements of the $O_2$ and $H_2$ separator of the vehicle oxygen generating system in accordance with a third embodiment.
Figure 10:
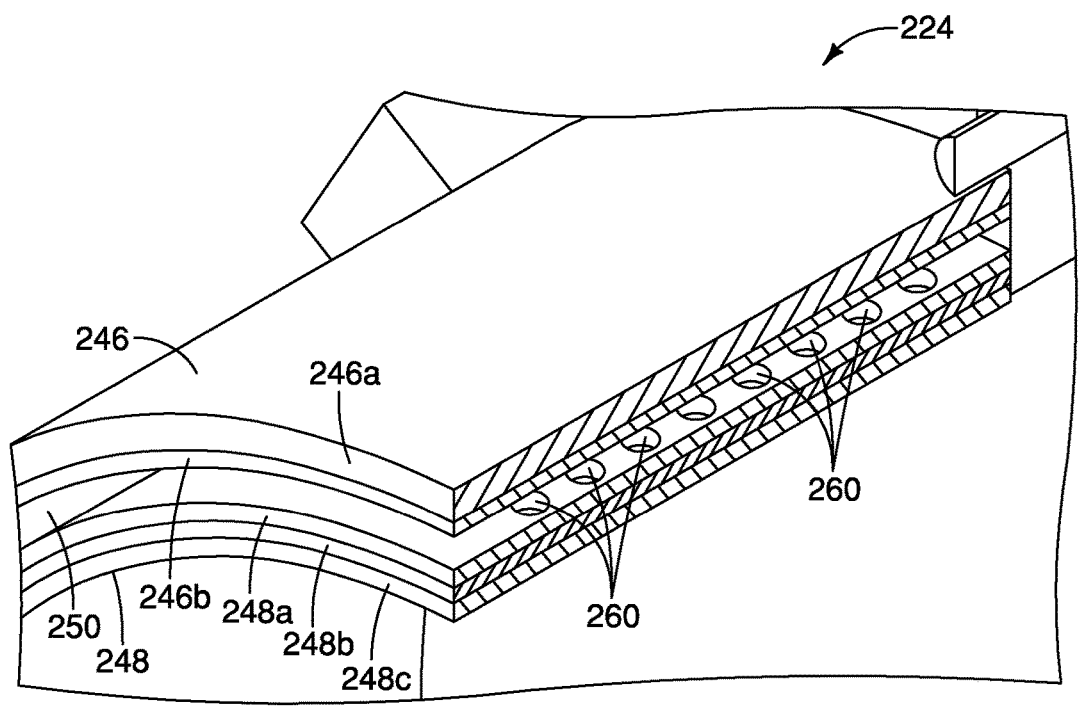
FIG. 10 is another perspective cross-sectional view of elements of the $O_2$ and $H_2$ separator of the vehicle oxygen generating system in accordance with the third embodiment.

Referring now to FIGS. 9 and 10, an $O_2$ and $H_2$ separator 224 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the second embodiment, the $O_2$ and $H_2$ separator 224 replaces the $O_2$ and $H_2$ separator 24 of the first embodiment. Specifically, the $O_2$ and $H_2$ separator 224 is installed to the $O_2$ delivery structure 28 with fresh air being fed into the $O_2$ delivery structure 28 and the $O_2$ and $H_2$ separator 224, as shown in FIG. 9.

The $O_2$ and $H_2$ separator 224 is positioned either within the engine compartment 18 or in an area of the vehicle 10 where fresh air can pass into the $O_2$ delivery structure 28 and through the $O_2$ and $H_2$ separator 224. It is further desirable for the $O_2$ and $H_2$ separator 224 to be positioned such that air can pass around the exterior of the $O_2$ and $H_2$ separator 224.

The $O_2$ and $H_2$ separator 224 in the third embodiment is an electrochemical $O_2$ generating device. The $O_2$ and $H_2$ separator 224 includes an outer electrochemical reaction layer 246 that is porous such that moisture accumulating on an outer surface thereof can migrate through the outer electrochemical reaction layer 246 (an outer wall). The $O_2$ and $H_2$ separator 224 also includes a bi-layer inner wall 248. The outer surface of the outer electrochemical reaction layer 246 and the inner surface of the bi-layer inner wall 248 can include serrations such that moisture is captured therein and can migrate through the outer electrochemical reaction layer 246 and bi-layer inner wall 248. An annular shaped chamber 250 is defined between the outer electrochemical reaction layer 246 and bi-layer inner wall 248.

The outer electrochemical reaction layer 246 includes an outer porous stainless steel outer portion 246a and an inner electrochemical reaction layer 246b. The bi-layer inner wall 248 includes an oxygen evolution layer 248a, a solid polymer electrolyte 248b, and a porous metal electrode portion 248c.

For operation of the $O_2$ and $H_2$ separator 224, temperatures within the $O_2$ and $H_2$ separator 224 must be greater than 80 degrees C., and preferably are between 80-150 degrees C. During operation, $H_2O$ from outside the $O_2$ and $H_2$ separator 224 and from within the $O_2$ and $H_2$ separator 224 migrates to the chamber 250. The chamber 250 is heated by electric heating coils (not shown) powered by the power source P. The chamber 250 is configured to retain $H_2O$ as steam along with released $O_2$. The inner electrochemical reaction layer 246b, the oxygen evolution layer 248a and the solid polymer electrolyte 248b cause electrolysis of the $H_2O$ thereby producing $O_2$ which migrates into the hollow interior of the $O_2$ and $H_2$ separator 224 through migration holes 260 and subsequently through the $O_2$ delivery structure 28 (not shown in FIGS. 9 and 10).

Fourth Embodiment

Figure 11:
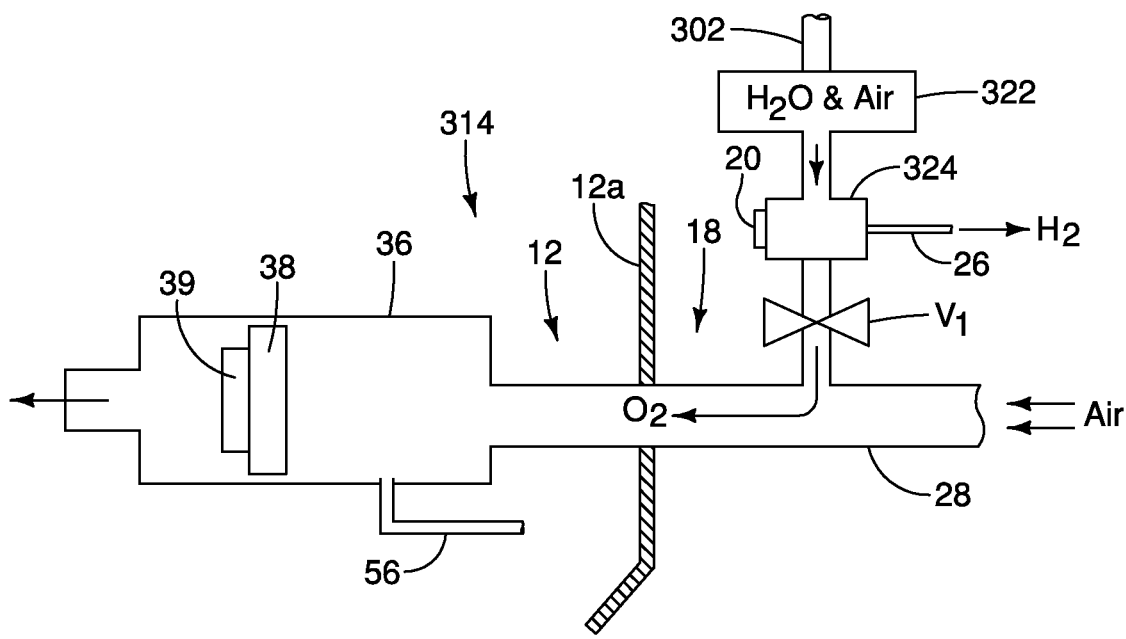
FIG. 11 is a schematic diagram showing an $O_2$ and $H_2$ separator of the vehicle oxygen generating system and an air handling assembly of the air conditioning system in accordance with a fourth embodiment.

Referring now to FIG. 11, an oxygen generating system 314 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The oxygen generating system 314 in accordance with the fourth embodiment is arranged such that an air inlet 302, the heat source 20, a $H_2O$ source 322, the valve $V_1$, an $O_2$ and $H_2$ separator 324 and the $H_2$ delivery structure 26 are all located within the engine compartment 18.

The air inlet 302 draws a minimal amount of fresh air into the $H_2O$ source 322 where moisture ($H_2O$) disbursed into the fresh air in large amounts via, for example, a misting head or spray nozzle (not shown) that assists in atomizing (vaporizing) the $H_2O$). The $O_2$ and $H_2$ separator 324 can operate as the $O_2$ and $H_2$ separator 24 or the $O_2$ and $H_2$ separator 24', as described above with respect to the first embodiment, but is preferably an electrochemical $O_2$ generator such as the $O_2$ and $H_2$ separator 224 of the third embodiment.

In the fourth embodiment, $H_2$ is drawn away by $H_2$ delivery structure 26 and the fresh air and $O_2$ from the $O_2$ and $H_2$ separator 324 are provided to the main air inlet of the vehicle air handling assembly 36 of the air conditioning system 30 via the $O_2$ delivery structure 28.

Fifth Embodiment

Figure 12:
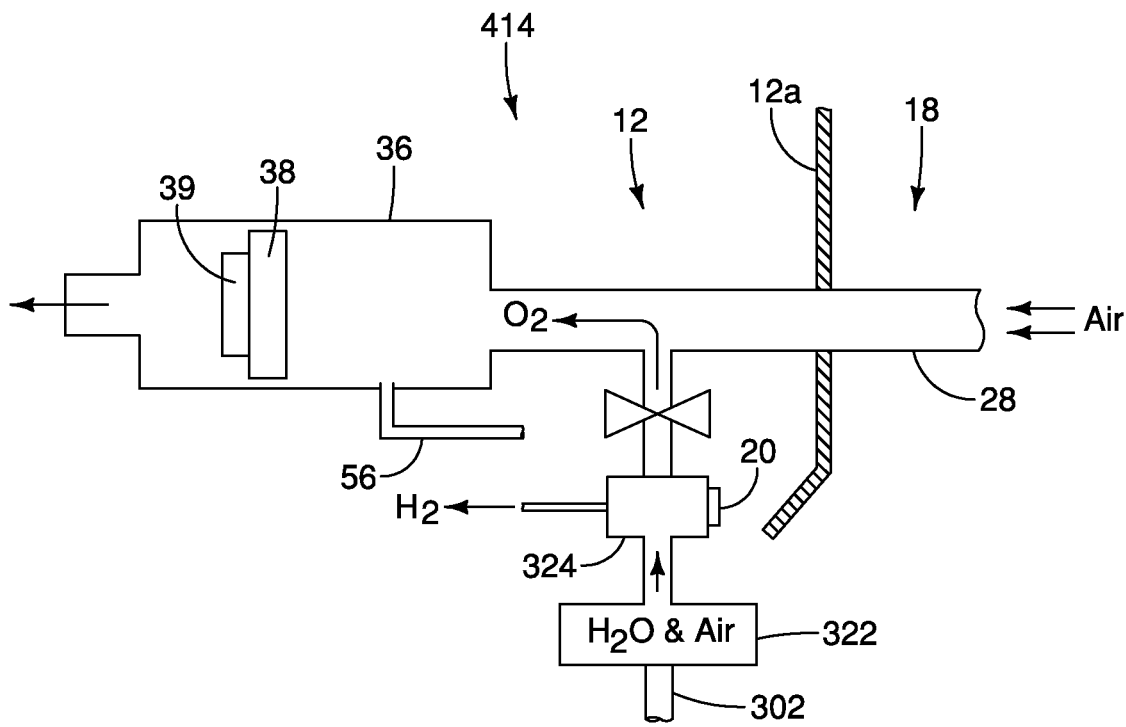
FIG. 12 is a schematic diagram showing an $O_2$ and $H_2$ separator of the vehicle oxygen generating system and an air handling assembly of the air conditioning system in accordance with a fifth embodiment.

Referring now to FIG. 12, an oxygen generating system 414 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The oxygen generating system 414 is identical to the oxygen generating system 314 of the fourth embodiment, except that in accordance with the fifth embodiment the air inlet 302, the heat source 20, the $H_2O$ source 322, the valve $V_1$, the $O_2$ and $H_2$ separator 324 and the $H_2$ delivery structure 26 are all located within the passenger compartment 12 upstream from the vehicle air handling assembly 36.

The air inlet 302 draws a minimal amount of fresh air into the $H_2O$ source 322 where moisture ($H_2O$) disbursed into the fresh air in large amounts via, for example, a misting head or spray nozzle (not shown) that assists in atomizing (vaporizing) the $H_2O$). The $O_2$ and $H_2$ separator 324 can operate as the $O_2$ and $H_2$ separator 24 or the $O_2$ and $H_2$ separator 24', as described above with respect to the first embodiment, but is preferably an electrochemical $O_2$ generator such as the $O_2$ and $H_2$ separator 224 of the third embodiment.

In the fourth embodiment, $H_2$ is drawn away by $H_2$ delivery structure 26 and the fresh air and $O_2$ from the $O_2$ and $H_2$ separator 324 are provided to the main air inlet of the vehicle air handling assembly 36 of the air conditioning system 30 via the $O_2$ delivery structure 28.

Sixth Embodiment

Figure 13:
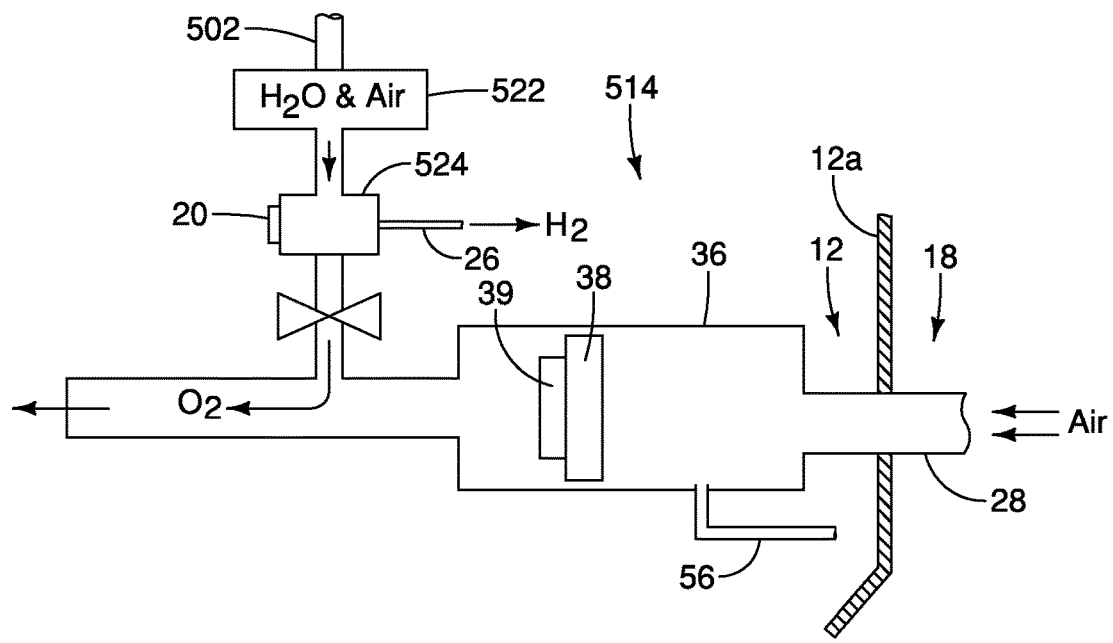
FIG. 13 is a schematic diagram showing an $O_2$ and $H_2$ separator of the vehicle oxygen generating system and an air handling assembly of the air conditioning system in accordance with a sixth embodiment.

Referring now to FIG. 13, an oxygen generating system 514 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The oxygen generating system 514 is identical to the oxygen generating systems 314 and 414 of the fourth and fifth embodiments, except that in accordance with the sixth embodiment the air inlet 302, the heat source 20, the $H_2O$ source 322, the valve $V_1$, the $O_2$ and $H_2$ separator 324 and the $H_2$ delivery structure 26 are all located within the passenger compartment 12 adjacent to the vehicle air handling assembly 36.

The air inlet 302 draws a minimal amount of fresh air into the $H_2O$ source 322 where moisture ($H_2O$) disbursed into the fresh air in large amounts via, for example, a misting head or spray nozzle (not shown) that assists in atomizing (vaporizing) the $H_2O$). The $O_2$ and $H_2$ separator 324 can operate as the $O_2$ and $H_2$ separator 24 or the $O_2$ and $H_2$ separator 24', as described above with respect to the first embodiment, but is preferably an electrochemical $O_2$ generator such as the $O_2$ and $H_2$ separator 224 of the third embodiment. In the sixth embodiment, $H_2$ is drawn away by $H_2$ delivery structure 26 and the fresh air and $O_2$ from the $O_2$ and $H_2$ separator 324 are provided directly into a duct delivering conditioned air downstream from the vehicle air handling assembly 36 of the air conditioning system 30.

Seventh Embodiment

Figure 14:
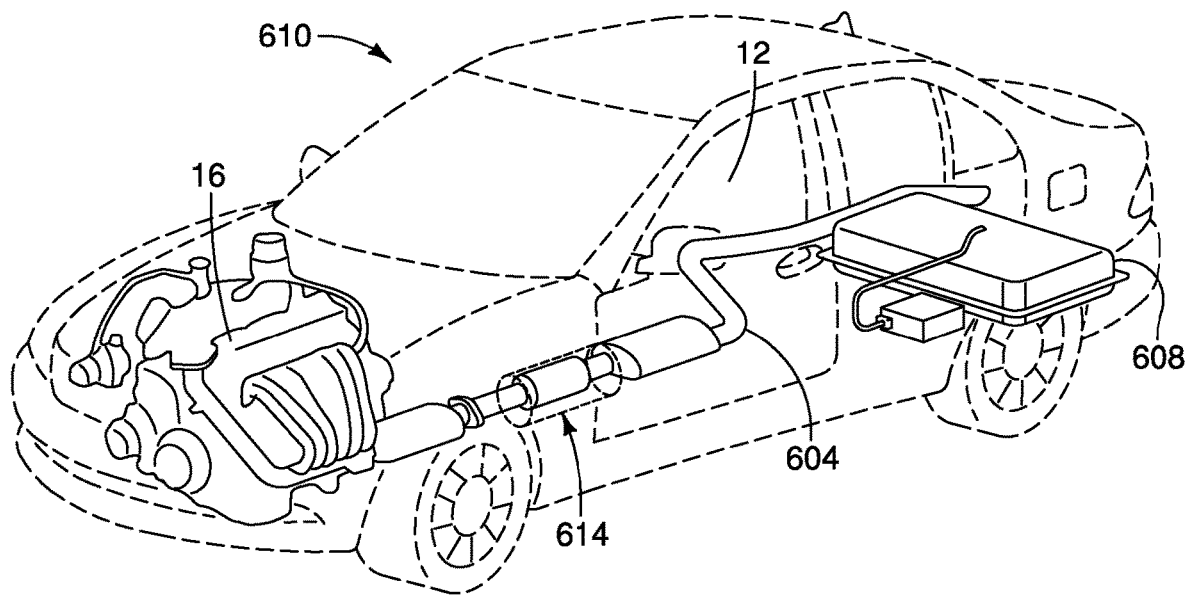
FIG. 14 is a perspective view of a vehicle that includes a passenger compartment, an engine, an air conditioning system and a vehicle oxygen generating system in accordance with a seventh embodiment.
Figure 15:
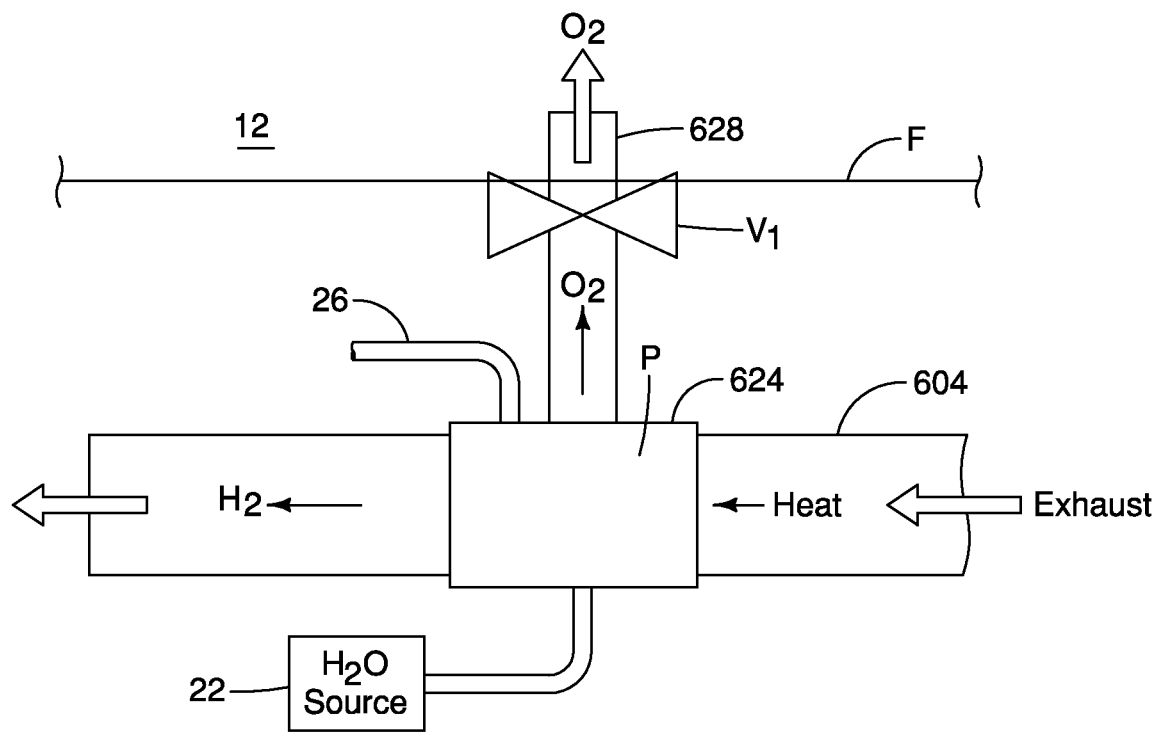
FIG. 15 is a schematic view of the oxygen generating system showing the $O_2$ and $H_2$ separator directing $O_2$ directly into the passenger compartment of the vehicle in accordance with the seventh embodiment.
Figure 16:
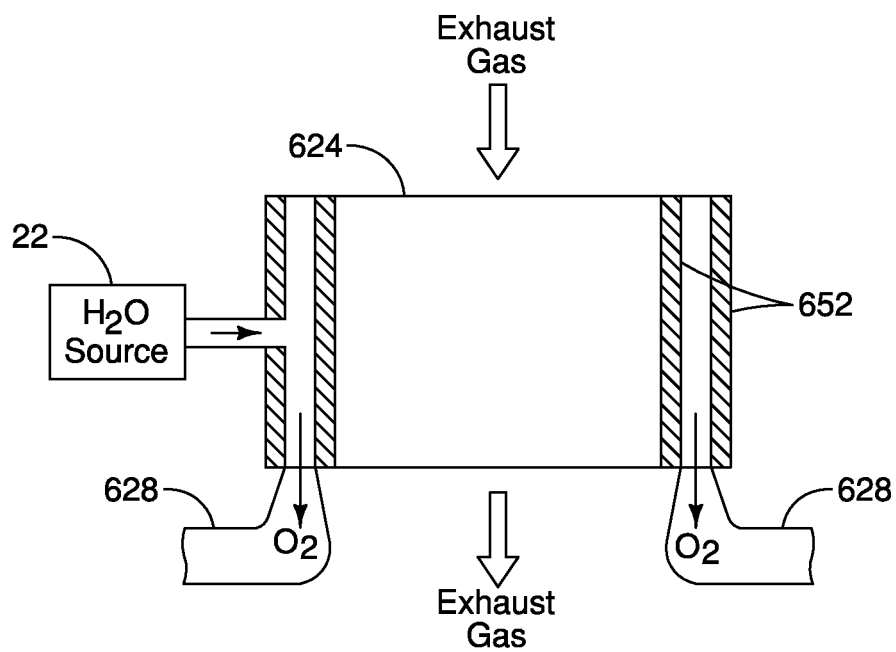
FIG. 16 is a cross-sectional view of a portion of the $O_2$ and $H_2$ separator of the oxygen generating system in accordance with the seventh embodiment.

Referring now to FIGS. 14, 15 and 16, a vehicle 610 having an oxygen generating system 614 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The vehicle 610 includes the passenger compartment 12, the engine 16, the $H_2O$ source 22 and the air conditioning system 30, as described with respect to the first embodiment. The vehicle 10' further includes an exhaust system 604 and a fuel system 608.

In the seventh embodiment, the oxygen generating system 614 includes an $O_2$ and $H_2$ separator 624 that can be an oxide electrolyzer material like the oxide electrolyzer material 52 described above with respect to the first embodiment or can alternatively be a proton electrolyzer (described in greater detail below).

The $O_2$ and $H_2$ separator 624 is concentrically arranged surrounding a portion of the exhaust system 604, thereby using heat in the exhaust gases passing through the exhaust system 604 as generated by the engine 16 as the heat source.

The oxygen generating system 614 further includes the $H_2O$ source 22, electric power P, the $H_2$ delivery structure 26 and an $O_2$ delivery structure 628. Water is provided to the $O_2$ and $H_2$ separator 624 from the $H_2O$ source 22 via a sprayer or misting nozzle (not shown) into the oxide electrolyzer material 652 within the $O_2$ and $H_2$ separator 624 (see FIG. 16). The electric power P is provided to the $O_2$ and $H_2$ separator 624 for the electrolysis process and the $H_2$ delivery structure 26 delivers $H_2$ to either the engine 16 or to the air surrounding the vehicle 610.

The $O_2$ delivery structure 628 directs $O_2$ generated by the electrolyzer of the $O_2$ and $H_2$ separator 624 through a floor F beneath the passenger compartment 12. The $O_2$ passing through the $O_2$ delivery structure 628 can be fed into the air handling assembly (not shown in FIGS. 14-16) of the air conditioning system (not shown in FIGS. 14-16) or can be directly fed into the passenger compartment 12, as shown in FIG. 15.

Eight Embodiment

Figure 17:
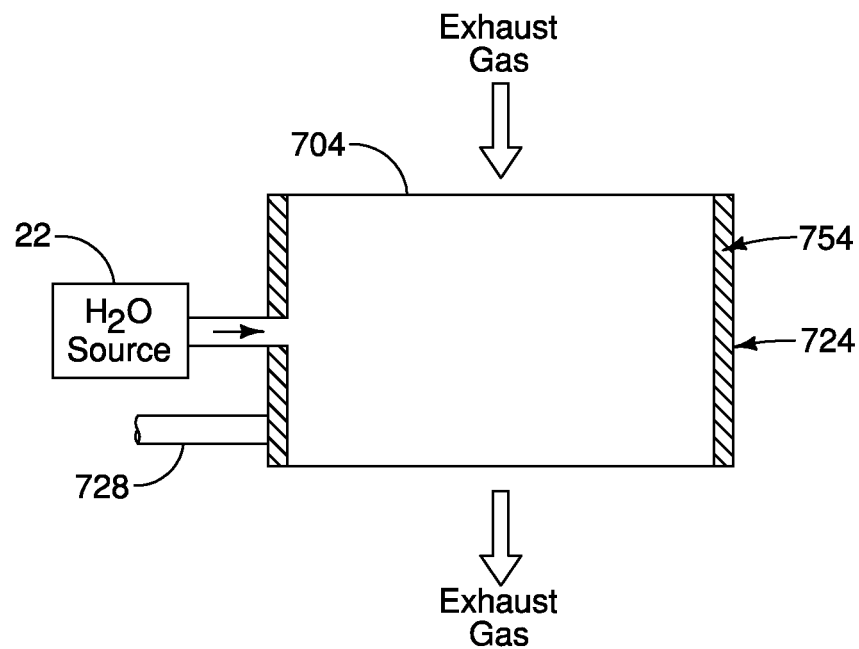
FIG. 17 is a cross-sectional view of a portion of the $O_2$ and $H_2$ separator of the oxygen generating system in accordance with an eighth embodiment.

Referring now to FIG. 17, a the $O_2$ and $H_2$ separator 724 of an oxygen generating system in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

The $O_2$ and $H_2$ separator 724 includes the $H_2O$ source 22 and an $O_2$ delivery structure 728. The $O_2$ and $H_2$ separator 724 has been modified as compared to $O_2$ and $H_2$ separator of the seventh embodiment in that the oxide electrolyzer material 652 in the seventh embodiment is replaced with a proton electrolyzer material 754. Hence, $H_2$ produced during the electrolytic process passes into the exhaust system 704. The produced $O_2$ is captured by the $O_2$ delivery structure.

Ninth Embodiment

Figure 18:
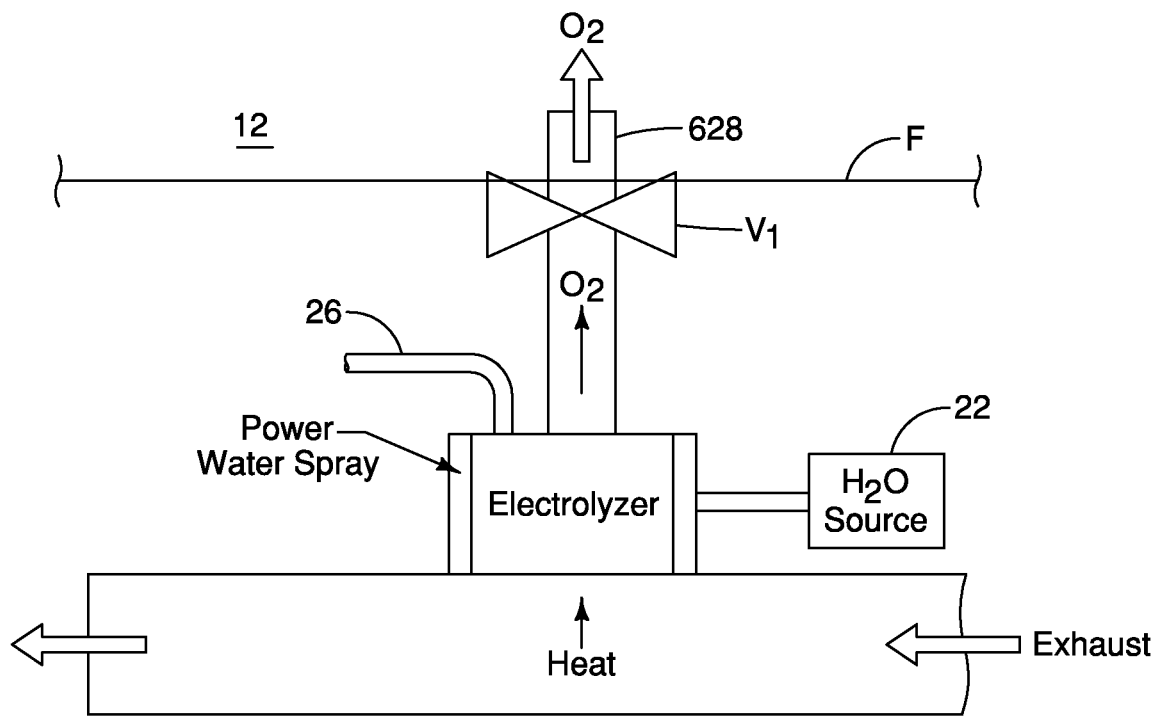
FIG. 18 is a schematic view of an oxygen generating system showing an $O_2$ and $H_2$ separator directing $O_2$ directly into the passenger compartment of the vehicle in accordance with a ninth embodiment.

Referring now to FIG. 18, an oxygen generating system 814 in accordance with a ninth embodiment will now be explained. In view of the similarity between the first and ninth embodiments, the parts of the ninth embodiment that are identical to the parts of the first embodiment will be given the same reference numerals as the parts of the first embodiment.

Similar to the embodiment described above with respect to FIG. 15, in the ninth embodiment the oxygen generating system 814 takes heat from the exhaust system 804 to heat $H_2O$ beneath the floor F of the passenger compartment 12 in order to vaporize the water. Specifically, an $O_2$ and $H_2$ separator 824 is positioned above and on a portion of the exhaust system 804. The $H_2O$ source 22 and the $H_2$ delivery structure 26 are connected to $O_2$ and $H_2$ separator 24. An $O_2$ delivery structure 824 is attached to the $O_2$ and $H_2$ separator 824 directing $O_2$ directly into the passenger compartment 12.

Tenth Embodiment

Figure 19:
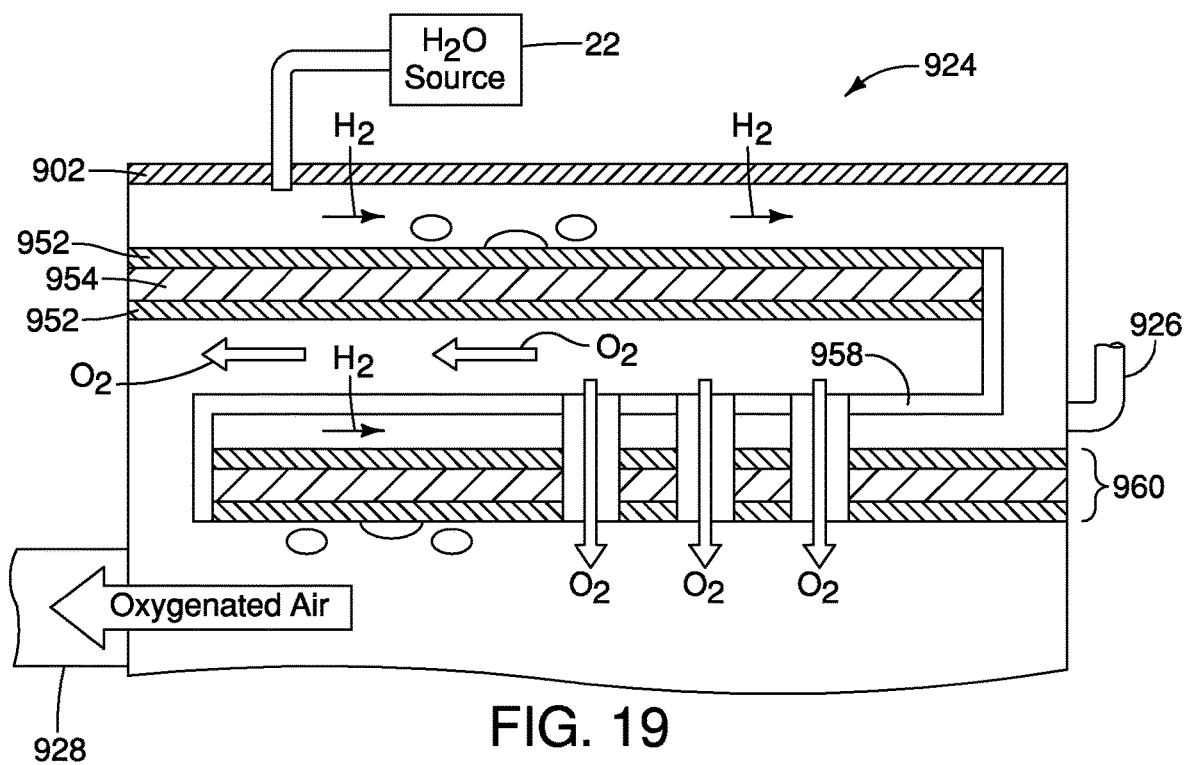
FIG. 19 is a cross-sectional view of a portion of an $O_2$ and $H_2$ separator in accordance with a tenth embodiment.

Referring now to FIG. 19, an $O_2$ and $H_2$ separator 924 of an oxygen generating system in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

The $O_2$ and $H_2$ separator 924 of the tenth embodiment is a dual layer electrolyzer that has a first electrolysis portion that includes an oxide membrane electrolyzer with oxide electrolyzer materials 952 and $O_2$ separating membrane 954, and a second electrolysis portion 960 with a proton membrane electrolyzer. Arrows $H_2$ show the direction of flow of hydrogen and arrows $O_2$ show the direction of flow of oxygen through the $O_2$ and $H_2$ separator 924. In FIG. 19, the $O_2$ and $H_2$ separator 924 is located along or within an air inlet structure 902.

The $H_2O$ source 22 delivers water/steam into a chamber that also defines a duct for the $H_2$ flow (see arrows $H_2$). Although not shown, the $H_2O$ source 22 also delivers water/steam to surfaces of the second electrolysis portion 960 with a proton membrane electrolyzer. An $H_2$ delivery structure 926 directs $H_2$ to atmosphere, the exhaust system or the engine. An $O_2$ delivery structure 928 delivers $O_2$ to either the passenger compartment or the air handling assembly (not shown in FIG. 19).

Eleventh Embodiment

Figure 20:
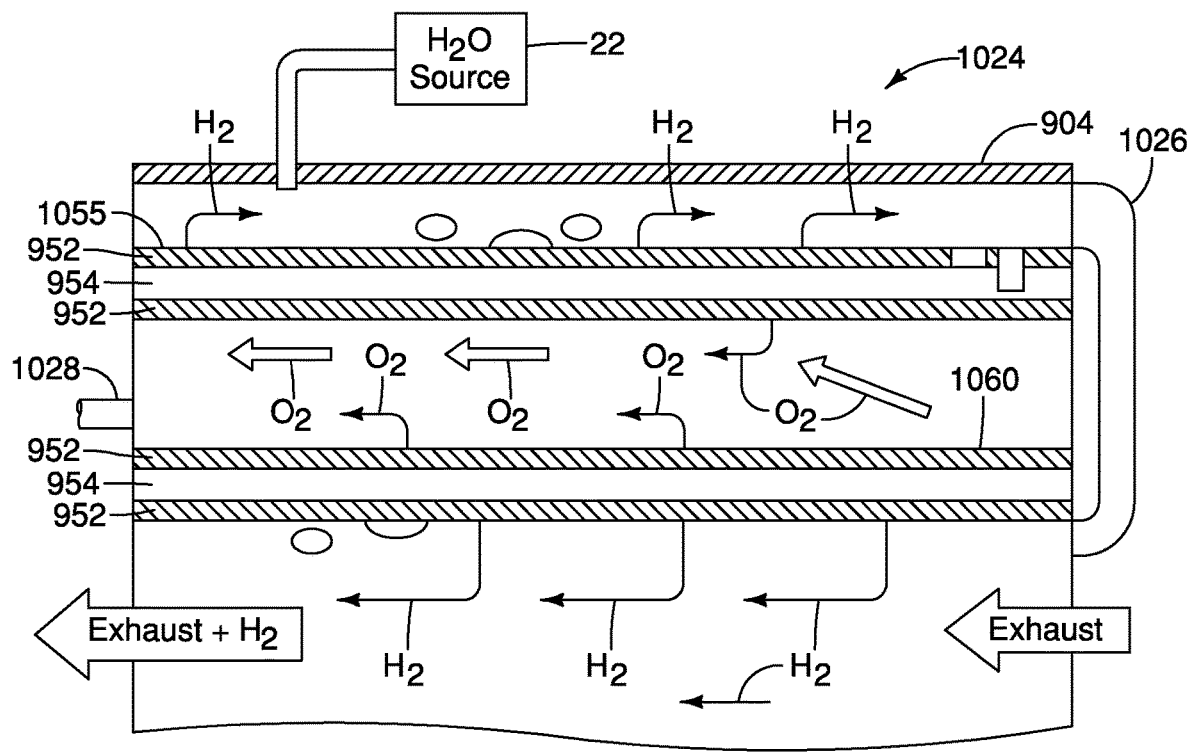
FIG. 20 is a cross-sectional view of a portion of an $O_2$ and $H_2$ separator in accordance with an eleventh embodiment.

Referring now to FIG. 20, an $O_2$ and $H_2$ separator 1024 of an oxygen generating system in accordance with an eleventh embodiment will now be explained. In view of the similarity between the first and eleventh embodiments, the parts of the eleventh embodiment that are identical to the parts of the first embodiment will be given the same reference numerals as the parts of the first embodiment. Moreover, the descriptions of the parts of the eleventh embodiment that are identical to the parts of the first embodiment may be omitted for the sake of brevity.

The $O_2$ and $H_2$ separator 1024 of the tenth embodiment is a dual layer oxide membrane electrolyzer that has a first electrolysis portion 1055 that includes an oxide membrane electrolyzer with oxide electrolyzer materials 952 and $O_2$ separating membrane 954, and a second electrolysis portion 1060 that also includes with $O_2$ separating membrane 954. Arrows $H_2$ show the direction of flow of hydrogen and arrows $O_2$ show the direction of flow of oxygen through the $O_2$ and $H_2$ separator 924. In FIG. 20, the $O_2$ and $H_2$ separator 1024 is located along or within an exhaust system 904.

The $H_2O$ source 22 delivers water/steam into a chamber that also defines a duct for the $H_2$ flow (see arrows $H_2$). An $H_2$ delivery structure 1026 directs $H_2$ to the exhaust system 904 of the engine. An $O_2$ delivery structure 1028 delivers $O_2$ to either the passenger compartment or the air handling assembly (not shown in FIG. 20).

Twelfth Embodiment

Figure 21:
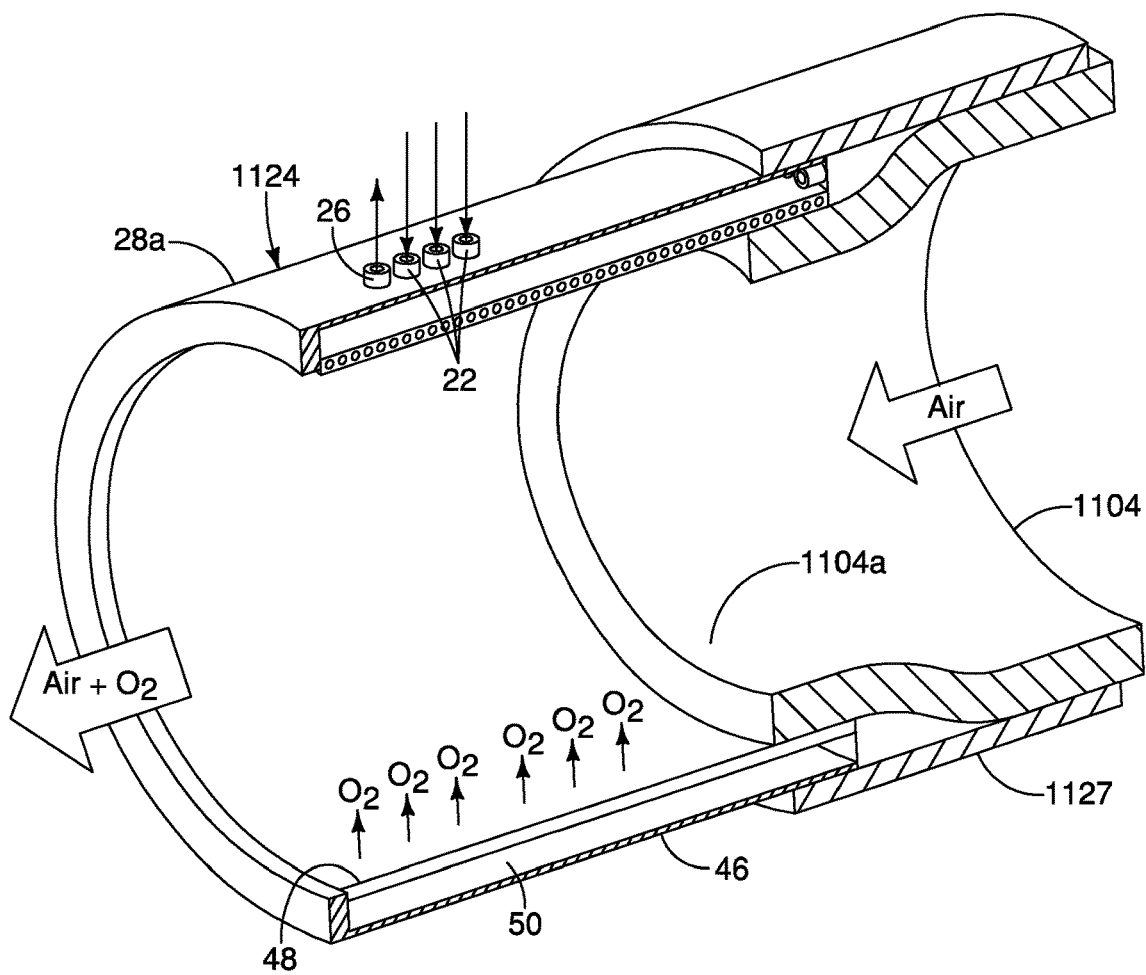
FIG. 21 is a cross-sectional perspective view of a portion of an $O_2$ and $H_2$ separator in accordance with a twelfth embodiment.
Figure 22:
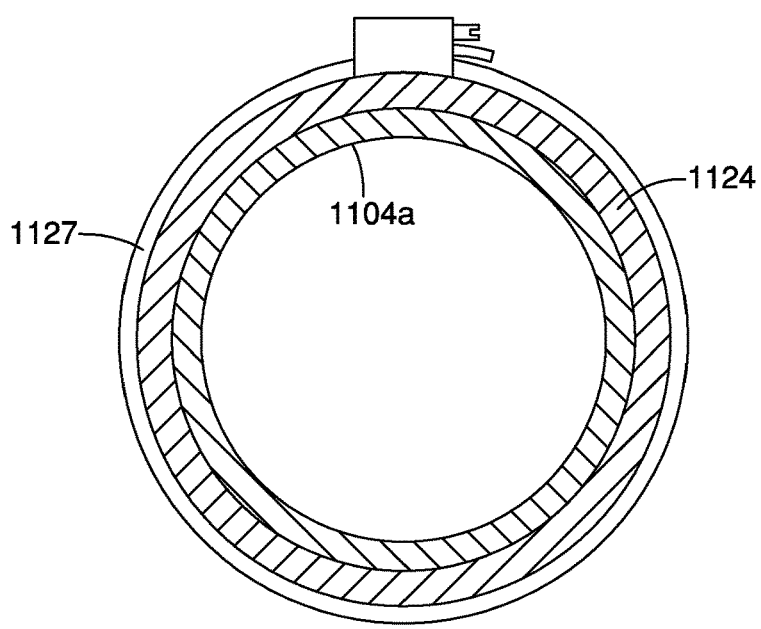
FIG. 22 is a cross-sectional end view of the $O_2$ and $H_2$ separator in accordance with the twelfth embodiment.

Referring now to FIGS. 21 and 22, an $O_2$ and $H_2$ separator 1124 of an oxygen generating system in accordance with a twelfth embodiment will now be explained. In view of the similarity between the first and twelfth embodiments, the parts of the eleventh embodiment that are identical to the parts of the first embodiment will be given the same reference numerals as the parts of the first embodiment. Moreover, the descriptions of the parts of the twelfth embodiment that are identical to the parts of the first embodiment may be omitted for the sake of brevity.

The $O_2$ and $H_2$ separator 1124 of the tenth embodiment is a single layer oxide membrane electrolyzer that is similar to the first embodiment depicted in FIG. 5. In the earlier embodiments, the various embodiments of the $O_2$ and $H_2$ separators can be welded or manufactured into the $O_2$ delivery structure. In the twelfth embodiment, the $O_2$ and $H_2$ separator 1124 is clamped to a flange 1104*a* of an $O_2$ delivery structure 1104 by a clamp 1127. Only one clamp 1127 is shown in FIGS. 21 and 22. The clamp 1127 is shown on an upstream side of the $O_2$ and $H_2$ separator 1124. However, it should be understood from the drawings and the description herein that the $O_2$ and $H_2$ separator 1124 can also be clamped to a further section of the $O_2$ delivery structure 1104 downstream from the $O_2$ and $H_2$ separator 1124.

As shown in FIG. 21, the $O_2$ and $H_2$ separator 1124 includes outer wall 46, the inner wall 48 of the duct section 28*a* (described above with respect to FIG. 5 of the first embodiment), and the chamber 50 defined between the outer wall 46 and the inner wall 48. The $O_2$ and $H_2$ separator 1124 further includes $H_2O$ source 22 and the $H_2$ delivery structure 26.

Although not shown in FIGS. 21 and 22, the $O_2$ and $H_2$ separator 1124 is provided with power in order to operate the electrolyzer. It should be understood from the drawings and the description herein that the electrolyzer in each of the above described embodiment is provided with power.

In the depicted twelfth embodiment, the flange 1104*a* of an $O_2$ delivery structure 1104 has an outer diameter that is smaller than or approximately equal to an inner diameter of the $O_2$ and $H_2$ separator 1124. Consequently, the flange 1104*a* is inserted into the $O_2$ and $H_2$ separator 1124 and the $O_2$ and $H_2$ separator 1124 is clamped to the flange 1104*a* via the clamp 1127.

Alternatively (not shown), the flange 1104*a* of the $O_2$ delivery structure 1104 can have an inner diameter that is larger than or approximately equal to an outer diameter of the $O_2$ and $H_2$ separator 1124. Consequently, one end of the $O_2$ and $H_2$ separator 1124 can be inserted into the flange 1104*a* of the $O_2$ delivery structure 1104. The $O_2$ delivery structure 1104 is then clamped to the $O_2$ and $H_2$ separator 1124 via the clamp 1127.

The AC controller 40 preferably includes a microcomputer with an air conditioning system control program and an oxygen generating system control program that control the oxygen generating system 14 and the air conditioning system 30, as discussed above. The AC controller 40 can also include other conventional components such as an input interface circuit, an output interface circuit, and storage devices such as a ROM (Read Only Memory) device and a RAM (Random Access Memory) device. The memory circuit stores processing results and control programs such as ones for air conditioning, valve $V_1$ and oxygen generating system operation that are run by the processor circuit. The controller 40 is operatively coupled to the air conditioning system 30, the valve $V_1$ and the oxygen generating system 14 in a conventional manner. The internal RAM of the controller 40 stores statuses of operational flags and various control data.

The various vehicle features and structures are conventional components that are well known in the art. Since such vehicle features and structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle oxygen generating system. Accordingly, these terms, as utilized to describe the present invention should be interpreted relative to a vehicle equipped with the vehicle oxygen generating system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle oxygen generating system, comprising:
   a heat source;
   a power source;
   a vehicle air handling assembly of a vehicle air conditioning system;
   an $H_2O$ source;
   an oxygen producing device having an annular chamber defined between an inner annular wall and an outer annular wall, one of the inner annular wall and the outer annular wall including an oxygen separating membrane, the oxygen producing device being connected to the $H_2O$ source receiving $H_2O$ therefrom, the oxygen producing device using heat from the heat source and electricity from the power source to produce $H_2$ and $O_2$ from $H_2O$, the $O_2$ produced by the oxygen producing device being directed to the vehicle air handling assembly and moved into a passenger compartment of a vehicle.

2. The vehicle oxygen generating system according to claim 1, wherein
the heat source is an electrically powered heating device.

3. The vehicle oxygen generating system according to claim 1, wherein
the heat source is a section of an exhaust system of the vehicle.

4. The vehicle oxygen generating system according to claim 1, wherein
the heat source is radiative heat from an engine of the vehicle.

5. The vehicle oxygen generating system according to claim 1, wherein
the heat source is a condenser of the vehicle air conditioning system.

6. The vehicle oxygen generating system according to claim 1, wherein
the oxygen producing device includes electrolyzer cells.

7. The vehicle oxygen generating system according to claim 6, wherein
the electrolyzer cells are polymer based electrolyzer cells.

8. The vehicle oxygen generating system according to claim 6, wherein
the electrolyzer cells are proton conducting electrolyzer cells.

9. The vehicle oxygen generating system according to claim 6, wherein
the electrolyzer cells are solid oxide based electrolyzer cells.

10. The vehicle oxygen generating system according to claim 1, wherein
the oxygen producing device also produces $H_2$ that is directed to engine fuel delivery system.

11. The vehicle oxygen generating system according to claim 1, wherein
the oxygen producing device also produces $H_2$ that is directed to an exhaust system of the vehicle.

12. The vehicle oxygen generating system according to claim 1, wherein
the $O_2$ produced by the oxygen producing device is located in an engine compartment of the vehicle and directs the $O_2$ to the vehicle air handling assembly at a location forward of a dash wall.

13. The vehicle oxygen generating system according to claim 1, wherein
the $O_2$ produced by the oxygen producing device is located within the passenger compartment upstream of the vehicle air handling assembly.

14. The vehicle oxygen generating system according to claim 1, wherein
the $O_2$ produced by the oxygen producing device is located within the passenger compartment downstream of the vehicle air handling assembly.

15. The vehicle oxygen generating system according to claim 1, wherein
the oxygen producing device encircles an air inlet of the vehicle air handling assembly.

16. The vehicle oxygen generating system according to claim 1, wherein
the oxygen producing device is spaced apart from an air inlet of the vehicle air handling assembly.

17. The vehicle oxygen generating system according to claim 1, wherein
the oxygen producing device is spaced apart from an air inlet of the vehicle air handling assembly and directs $O_2$ into the air inlet of the vehicle air handling assembly.

18. The vehicle oxygen generating system according to claim 1, wherein
the oxygen producing device is spaced apart from an air outlet of the vehicle air handling assembly and directs $O_2$ into the air outlet of the vehicle air handling assembly.

19. A vehicle oxygen generating system, comprising:
a power source;
a heat source;
an $H_2O$ source;
an oxygen producing device having an annular chamber defined between an inner annular wall and an outer annular wall, one of the inner annular wall and the outer annular wall including an oxygen separating membrane, the oxygen producing device being connected to the $H_2O$ source receiving $H_2O$ therefrom, the oxygen producing device using heat from the heat source and electricity from the power source to produce $H_2$ and $O_2$ from $H_2O$, the $O_2$ produced by the oxygen producing device being directed to a passenger compartment of a vehicle.

* * * * *